(12) United States Patent
Zhou

(10) Patent No.: US 11,660,682 B2
(45) Date of Patent: May 30, 2023

(54) CHUCK WITH LOCKING CLUTCH

(71) Applicants: JACOBS CHUCK MANUFACTUIRNG (SUZHOU) COMPANY, LTD., Jiangsu (CN); APEX BRANDS, INC., Apex, NC (US)

(72) Inventor: Jichun Zhou, Suzhou (CN)

(73) Assignees: APEX BRANDS, INC., Apex, NC (US); JACOBS CHUCK MANUFACTUIRNG (SUZHOU) COMPANY, LTD., Jiangsu (CN)

( * ) Notice: Subject to any disclaimer, the term of this patent is extended or adjusted under 35 U.S.C. 154(b) by 0 days.

(21) Appl. No.: 17/616,476

(22) PCT Filed: Jun. 3, 2019

(86) PCT No.: PCT/CN2019/089813
§ 371 (c)(1),
(2) Date: Dec. 3, 2021

(87) PCT Pub. No.: WO2020/243878
PCT Pub. Date: Dec. 10, 2020

(65) Prior Publication Data
US 2022/0176465 A1 Jun. 9, 2022

(51) Int. Cl.
*B23B 31/12* (2006.01)
(52) U.S. Cl.
CPC ........ *B23B 31/1238* (2013.01); *B23B 31/123* (2013.01); *B23B 2231/38* (2013.01)
(58) Field of Classification Search
CPC .............. B23B 31/1238; B23B 31/123; B23B 2231/38; Y10T 279/17641; Y10T 279/32
See application file for complete search history.

(56) References Cited

U.S. PATENT DOCUMENTS 2,684,856 A * 7/1954 Stoner ................. B23B 31/1238
279/110
3,506,277 A  4/1970 Harms
(Continued)

FOREIGN PATENT DOCUMENTS

| EP | 0188354 A2 * | 7/1986 |
| WO | 2017024544 A1 | 2/2017 |
| WO | 2019019165 A1 | 1/2019 |

OTHER PUBLICATIONS

International Search Report and Written Opinion dated Mar. 9, 2020, all pages cited in its entirety.

*Primary Examiner* — Boyer D Ashley
*Assistant Examiner* — Reinaldo A Vargas del Rio
(74) *Attorney, Agent, or Firm* — Burr & Forman LLP

(57) ABSTRACT

A chuck (10) is provided that includes a plurality of jaws (20) and a body (30) configured to rotate with a drive spindle of a power driver. The chuck (10) may also include a nut (80) comprising nut teeth (82). The nut (80) may be operably coupled to the jaws (20) and configured to move the jaws (20) relative to the body (30) in the opening or closing direction. The chuck (10) may also include a clutch (100) comprising clutch teeth (102). The clutch (100) may be configured to move between a working position and a jaw actuating position. In the working position, the clutch teeth (102) may be engaged with the nut teeth (82) to prevent movement of the nut (80) relative to the body (30), and, in the jaw actuating position, the clutch teeth (102) need not be engaged with the nut teeth (82) and the nut (80) may be free to move relative to the body (30).

15 Claims, 15 Drawing Sheets

(56) References Cited

U.S. PATENT DOCUMENTS

| | | | | |
|---|---|---|---|---|
| 3,545,776 | A | * | 12/1970 | Haviland ............ B23B 31/1246 433/129 |
| 4,682,918 | A | * | 7/1987 | Palm .................... B23B 31/123 279/60 |
| 4,840,387 | A | * | 6/1989 | McCarthy ........... B23B 31/1238 279/134 |
| 5,009,439 | A | * | 4/1991 | Sakamaki ............. B23B 31/123 279/62 |
| 5,174,588 | A | | 12/1992 | Reibetanz et al. |
| 5,183,274 | A | * | 2/1993 | Sakamaki ........... B23B 31/1238 279/140 |
| 6,182,978 | B1 | * | 2/2001 | Hsueh ................... B23B 31/123 279/62 |
| 6,409,181 | B1 | * | 6/2002 | Hsueh ................ B23B 31/1238 279/140 |
| 9,296,046 | B2 | * | 3/2016 | Yang ....................... F16B 39/28 |
| 10,376,965 | B2 | * | 8/2019 | Hengsberger ......... B23B 31/123 |
| 10,603,722 | B2 | * | 3/2020 | Zhou .................. B23B 31/1238 |
| 2004/0032095 | A1 | | 2/2004 | Rohm |
| 2007/0052182 | A1 | | 3/2007 | Bordeianu |
| 2013/0264781 | A1 | | 10/2013 | Neil |

\* cited by examiner

CHUCK WITH LOCKING CLUTCH

TECHNICAL FIELD

Example embodiments generally relate to chucks for use with power drivers including power drills, and more particularly, relate to lockable chucks.

BACKGROUND

Power drivers with rotating drive spindles are often operably coupled to a chuck that is adjustable in size to be able to attach to various working bits, such as drill bits or other tools that are rotated with the chuck by the drive spindle of the power driver. Conventional chucks typically employ moveable jaws that are operable to adjust the diameter of an opening in the chuck for receiving a working bit. In many instances these jaws are held in place while the power driver is in a working mode (e.g., drilling a hole, driving a fastener, etc.) by a nut with a threaded engagement with the jaws. In some instances, due to inertia created by rotation and vibration, particularly in the case of a power driver that is an impact power driver, the nut can move relative to the body of the chuck while performing a working operation, such as, drilling a hole, driving a fastener, or the like. Movement of the nut can lead to unexpected and undesired over-tightening of the jaws onto the working bit or loosening of the jaws allowing the working bit to slip or be released from jaws. As such, innovation in the area of preventing unexpected and undesired movement of the nut is needed to maintain clamping forces on the working bit even in the presence of inertial forces and vibrations affecting the nut.

SUMMARY OF SOME EXAMPLES

According to some example embodiments, an example chuck is provided that may be configured for use with a power driver having a rotatable drive spindle (e.g., an impact driver). The example chuck may comprise a plurality of jaws with each jaw including jaw threading. The example chuck may further comprise a body configured to rotate with the drive spindle. The plurality of jaws may be configured to rotate with the body about a center axis of the example chuck. The plurality of jaws may also be configured to move relative to the body in an opening or closing direction. The example chuck may further comprise a nut operably coupled with the jaw threading of the jaws such that rotation of the nut relative to the body moves the jaws relative to the body in the opening or closing direction. The nut may further comprise nut teeth. The example chuck may further comprise a clutch including clutch teeth. The clutch may be operably coupled to the body such that the clutch rotates with the body. The clutch may be configured to move between a working position and a jaw actuating position. In the working position, the clutch teeth may be engaged with the nut teeth to prevent rotation of the nut relative to the body, and, in the jaw actuating position, the clutch teeth need not be engaged with the nut teeth and the nut may be rotatable about the body.

According to some example embodiments, another example chuck is provided that comprises a plurality of jaws and a body configured to rotate with a drive spindle of a power driver. The plurality of jaws may be configured to rotate with the body about a center axis of the chuck, and the plurality of jaws may also be configured to move relative to the body in an opening or closing direction. The example chuck may also comprise a nut comprising nut teeth. The nut may be operably coupled to the jaws and configured to move the jaws relative to the body in the opening or closing direction. The example chuck may also comprise a clutch including clutch teeth. The clutch may be configured to move between a working position and a jaw actuating position. In the working position, the clutch teeth may be engaged with the nut teeth to prevent movement of the nut relative to the body, and, in the jaw actuating position, the clutch teeth need not be engaged with the nut teeth and the nut may be free to move relative to the body.

According to some example embodiments, another example chuck is provided. In this regard, the example chuck may comprise a plurality of jaws and a body configured to rotate with a drive spindle of a power driver. The plurality of jaws may be configured to rotate with the body about a center axis of the chuck, and the plurality of jaws may also be configured to move relative to the body in an opening or closing direction. The example chuck may also comprise a nut comprising nut teeth. The nut may be operably coupled to the jaws and configured to move the jaws relative to the body in the opening or closing direction. The example chuck may also comprise a clutch including clutch teeth. The clutch may be movable by a user between a working position and a jaw actuating position. The clutch may comprise a working position recess and a jaw actuation recess. The example chuck may also comprise a protrusion extending and biased in a radial direction away from the center axis of the chuck. The clutch may be configured to, in response to a user sliding the clutch into the working position, engage the clutch teeth with the nut teeth to prevent movement of the nut relative to the body and move the working position recess into engagement with the protrusion to maintain the clutch in the working position. The clutch may be further configured to, in response to the user sliding the clutch into the jaw actuating position, disengage the clutch teeth from the nut teeth to permit the nut to move relative to the body to move the plurality of the jaws in the opening or closing direction and move the jaw actuating position recess into engagement with the protrusion to maintain the clutch in the jaw actuating position.

BRIEF DESCRIPTION OF THE DRAWINGS

Figure 1:
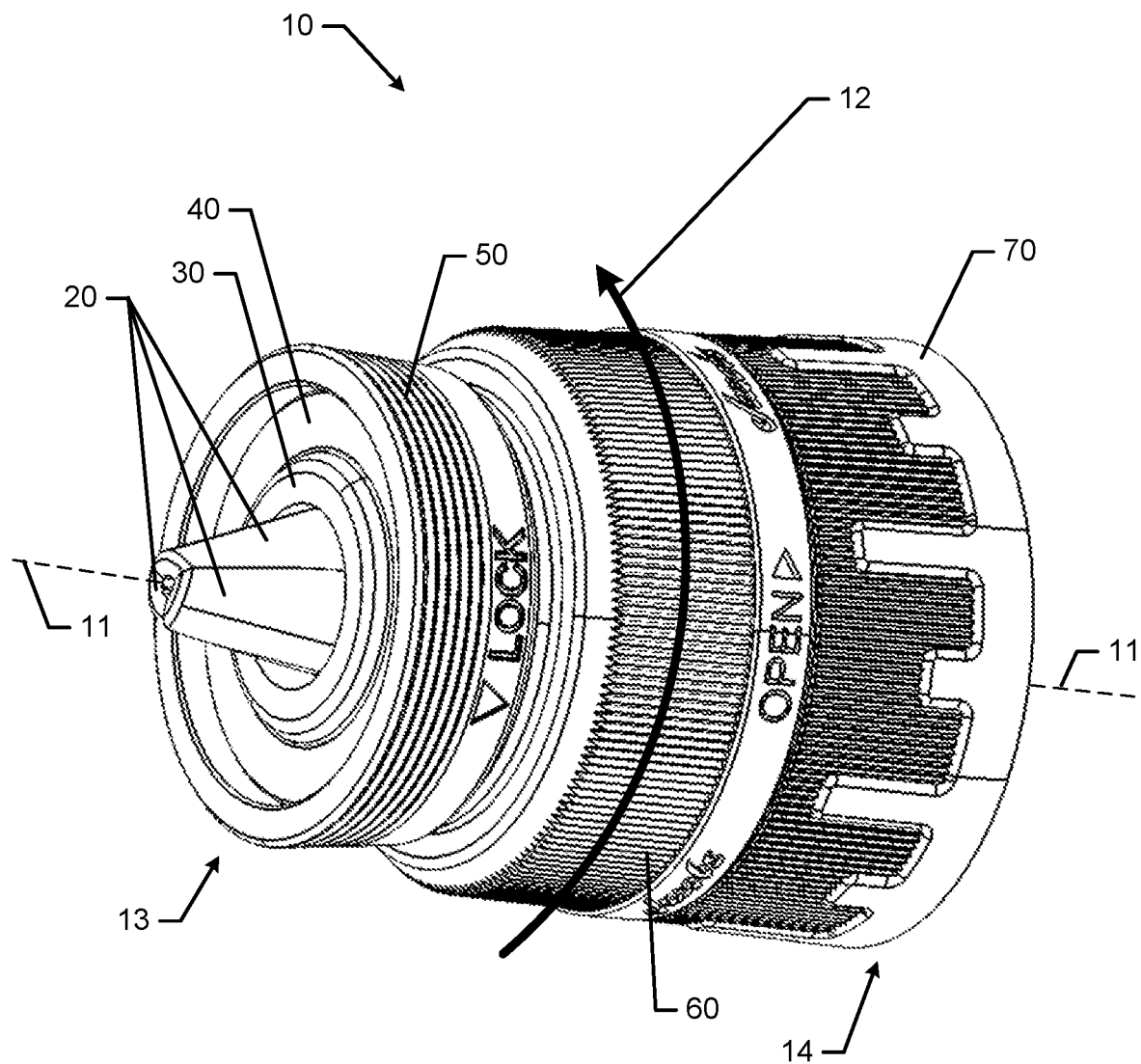
Figure 2:
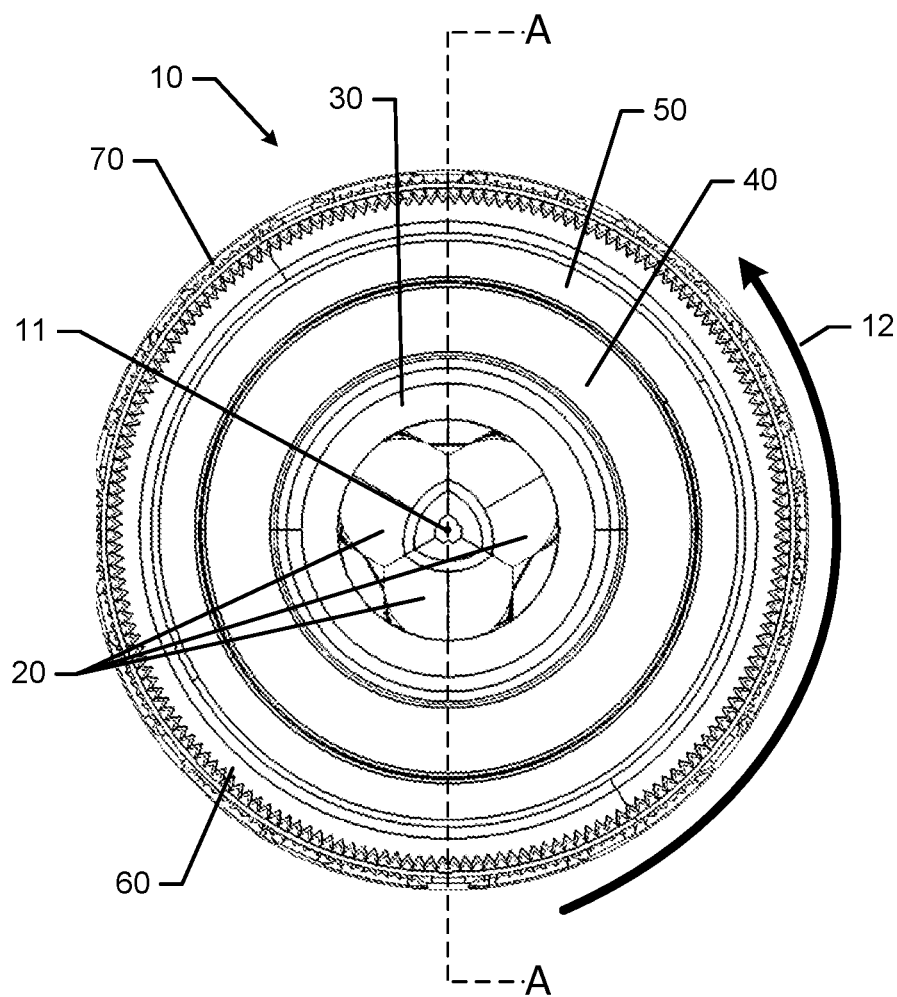
Figure 3:
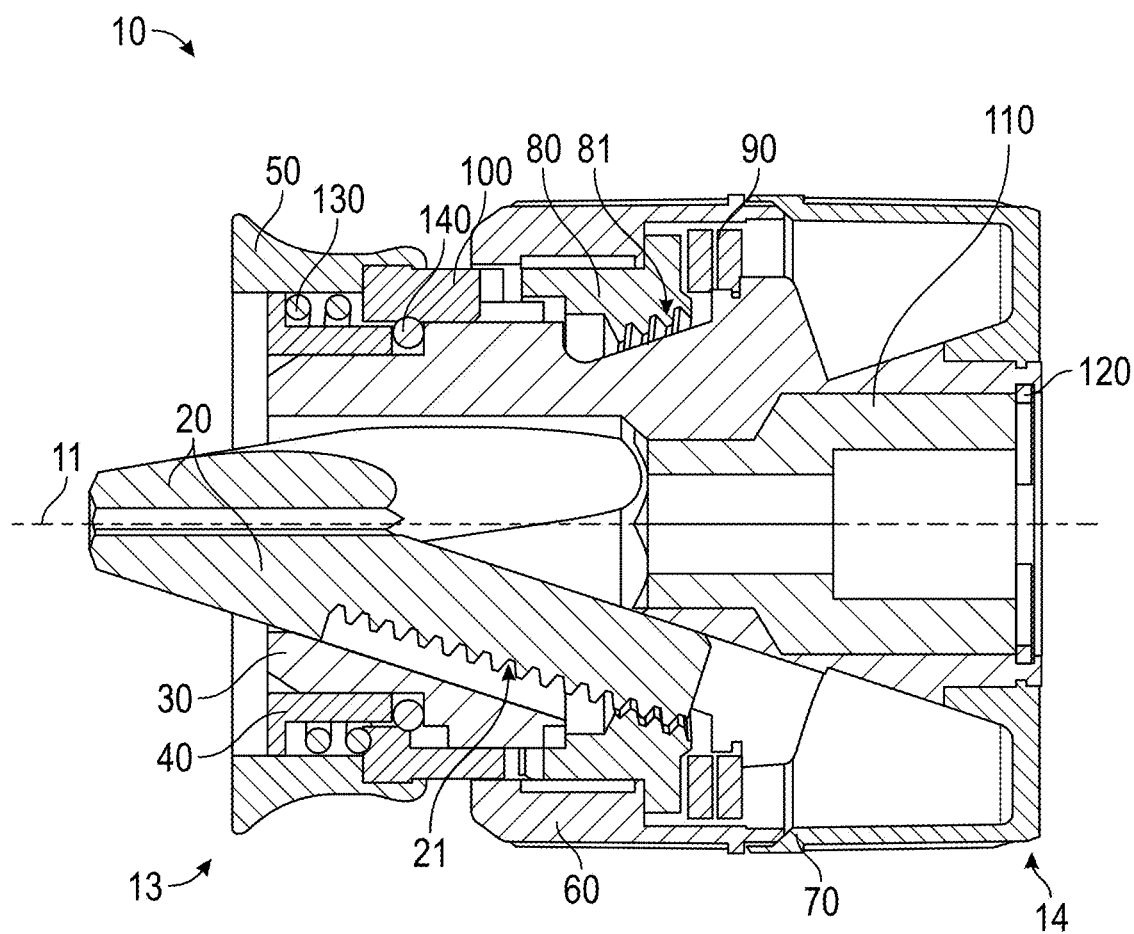
Figure 4:
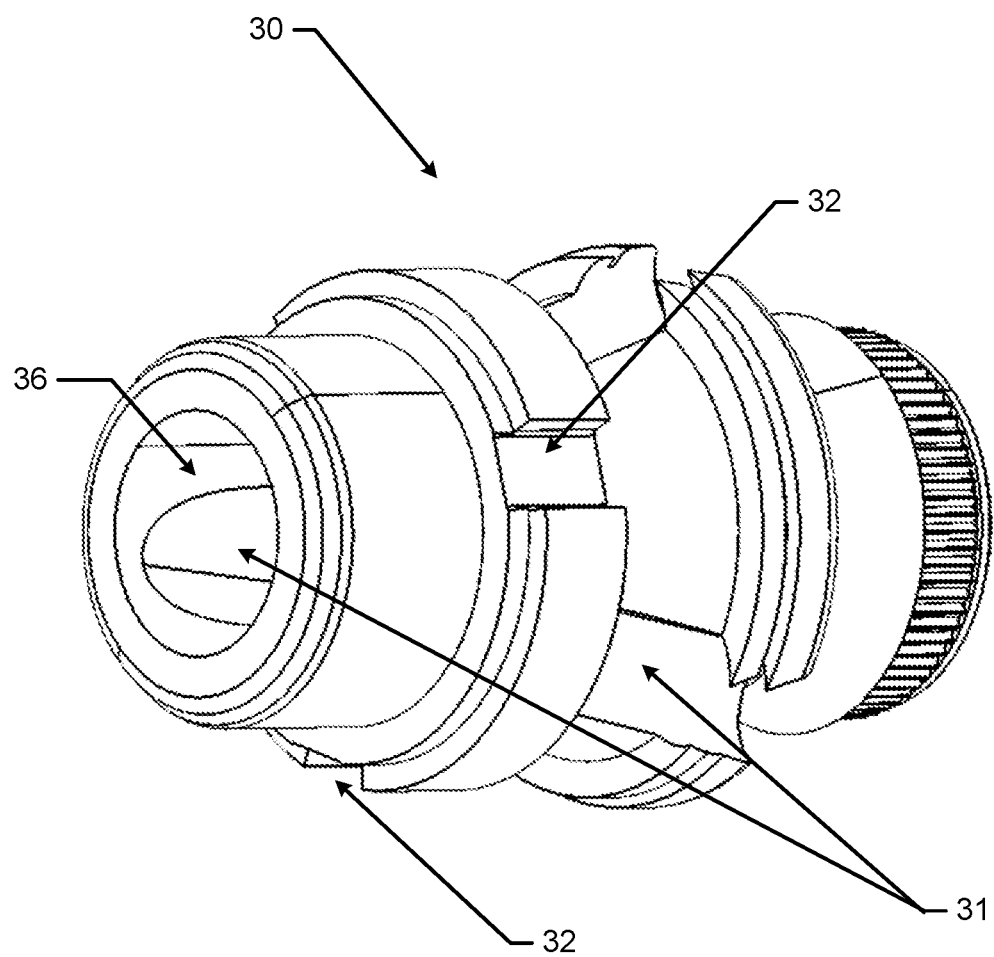
Figure 5:
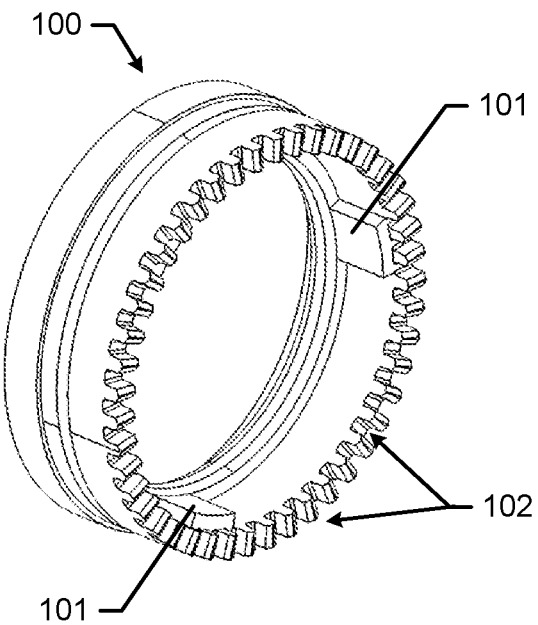
Figure 6:
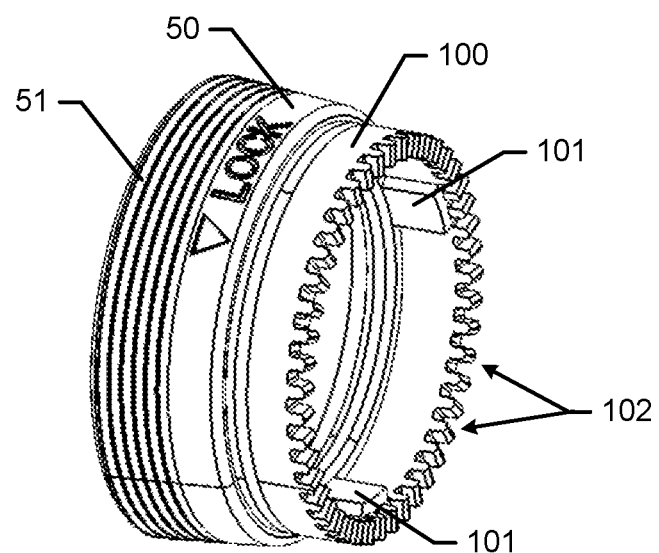
Figure 7:
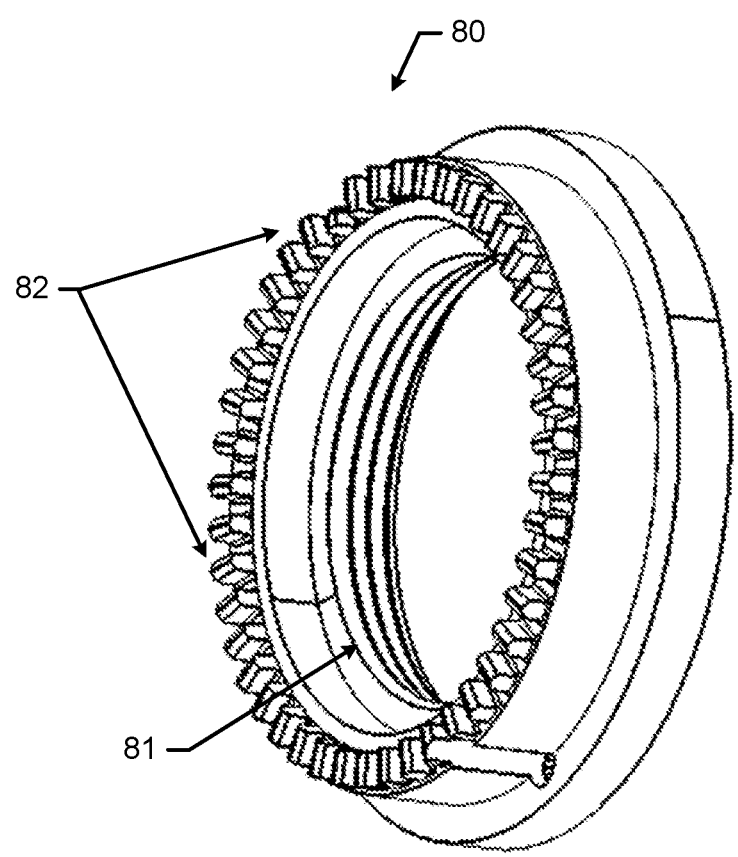
Figure 8:
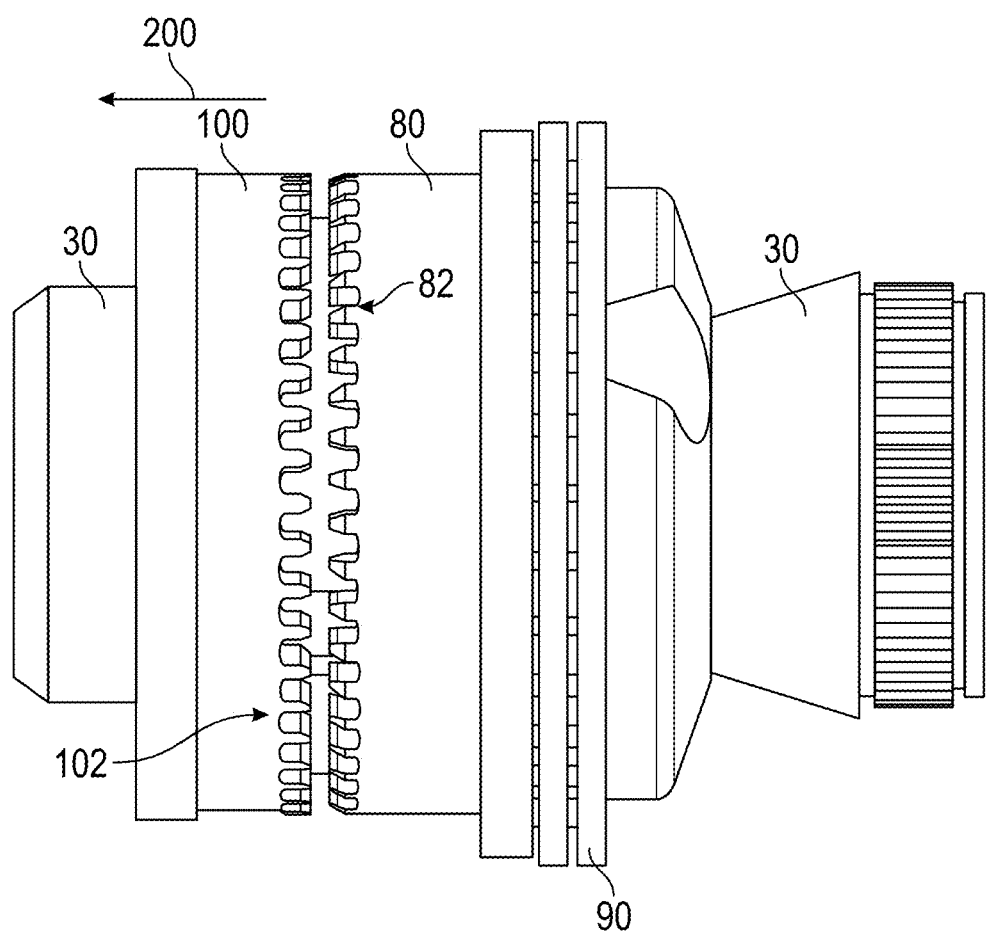
Figure 9:
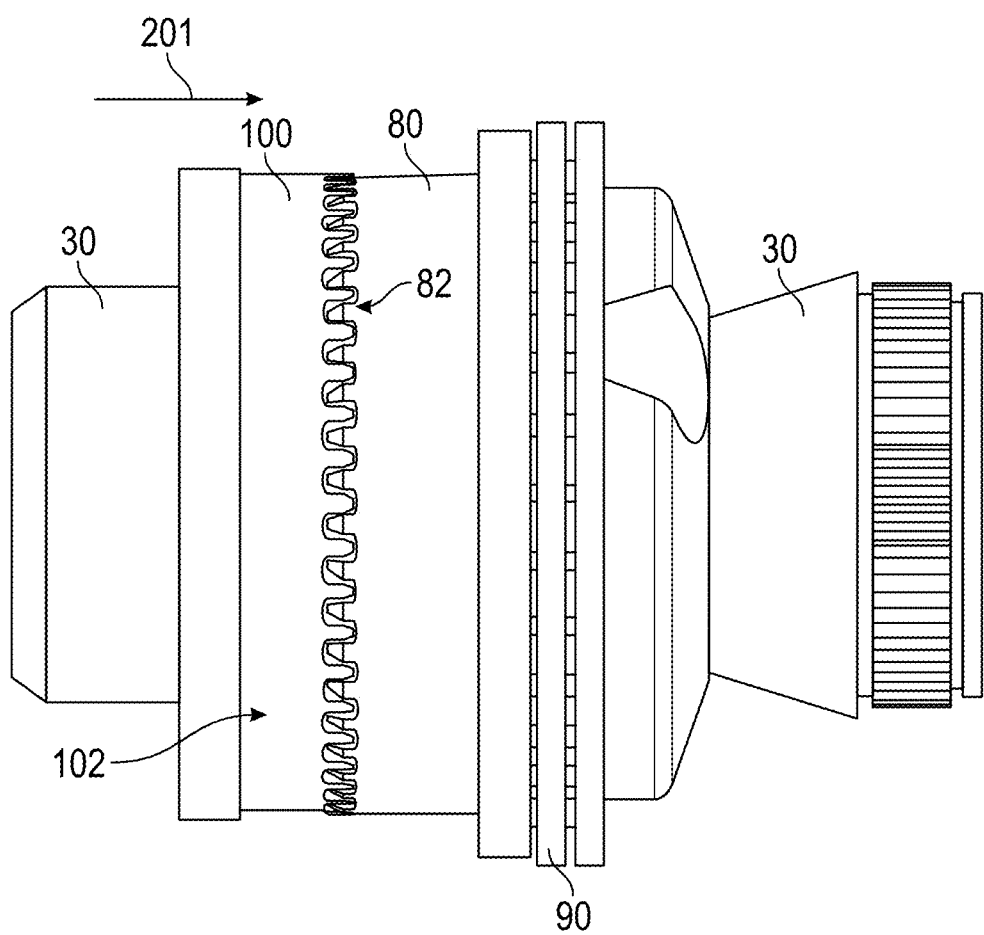
Figure 10A:
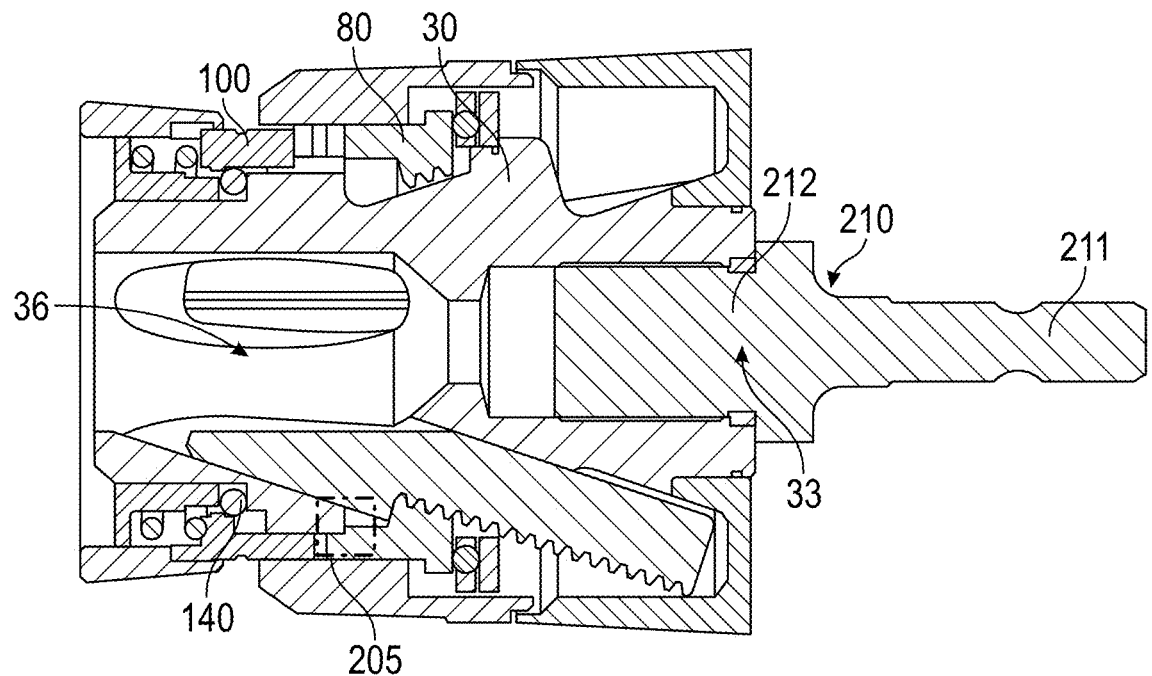
Figure 10B:
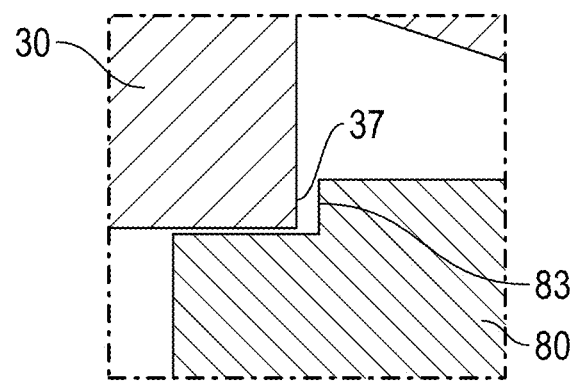
Figure 11A:
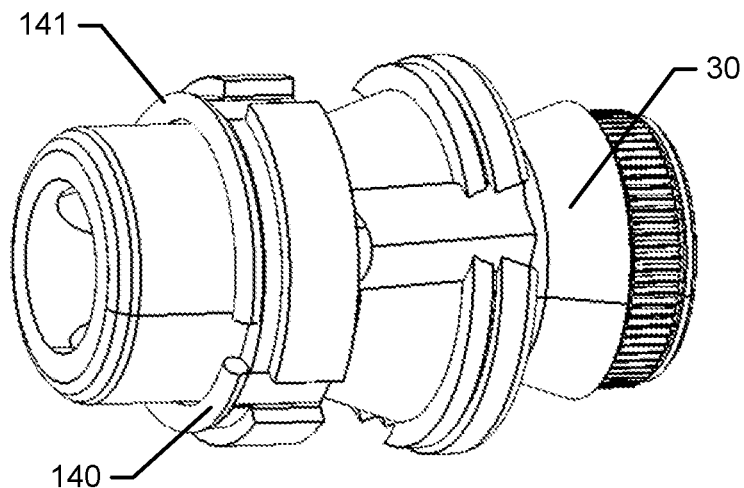
Figure 11B:
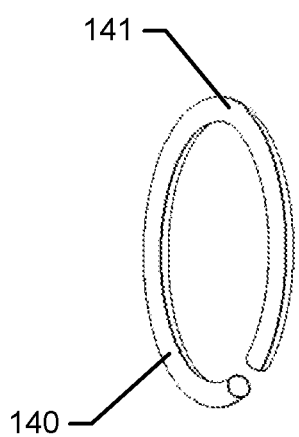
Figure 12:
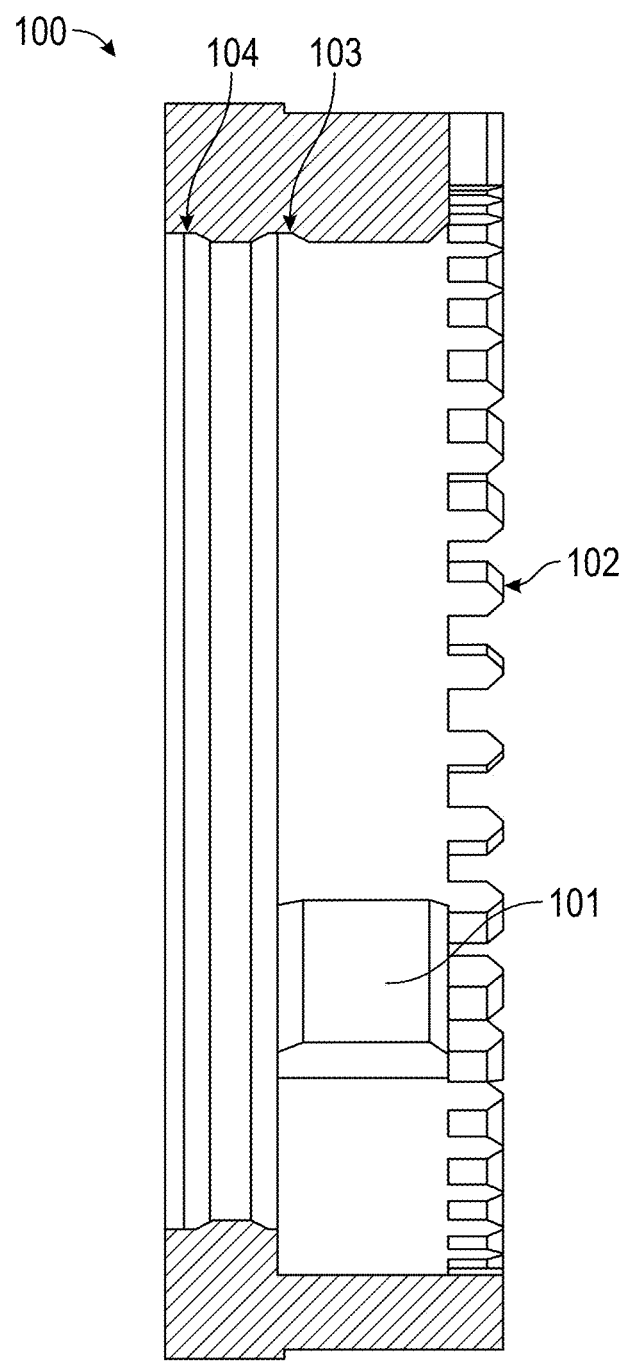
Figure 13A:
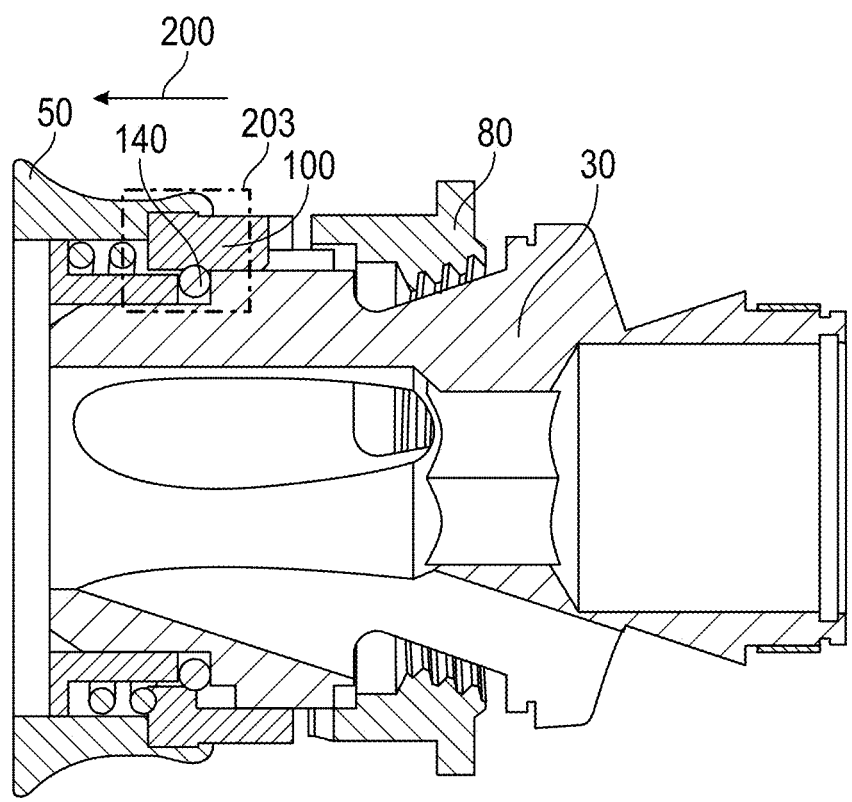
Figure 13B:
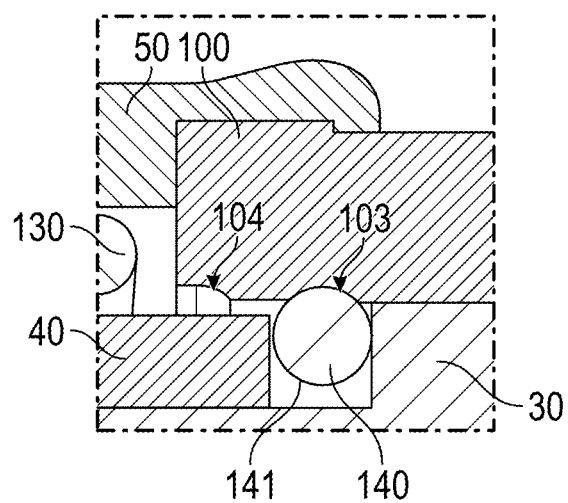
Figure 14A:
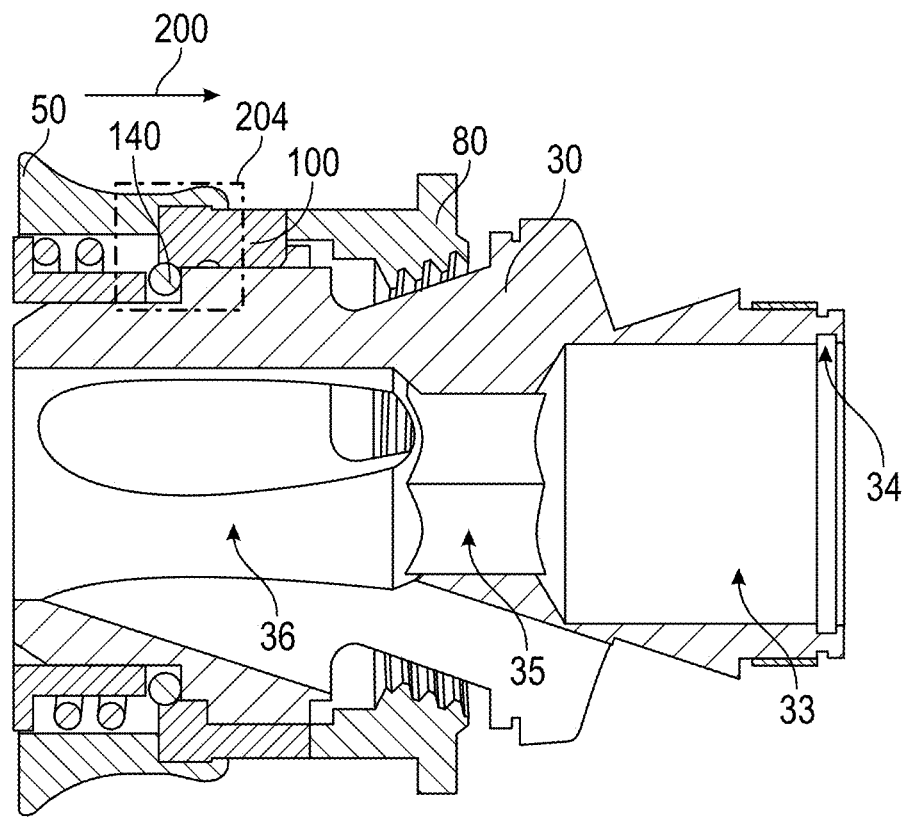
Figure 14B:
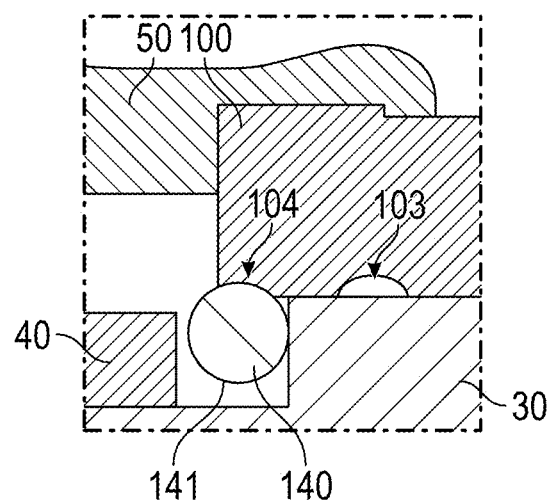
Figure 15:
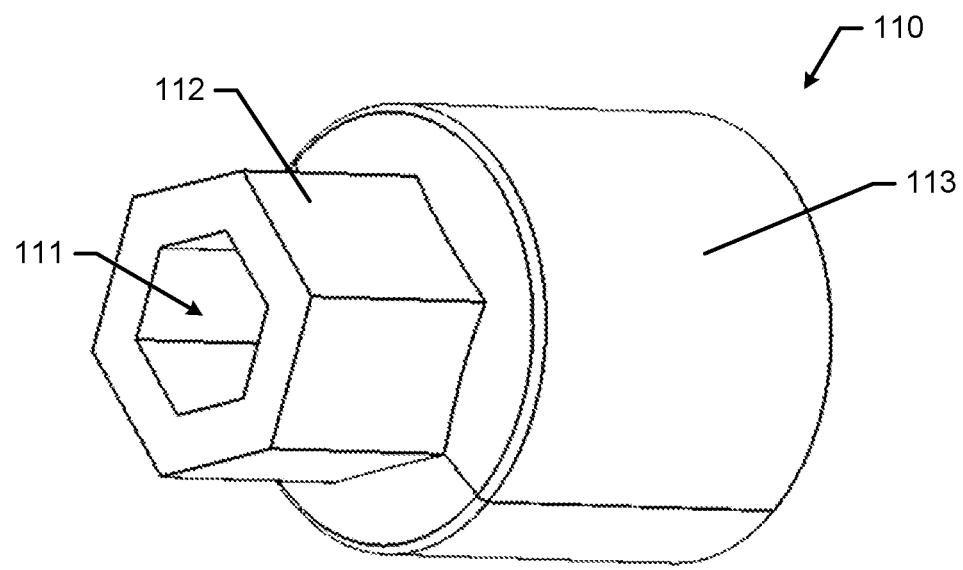
Figure 16:
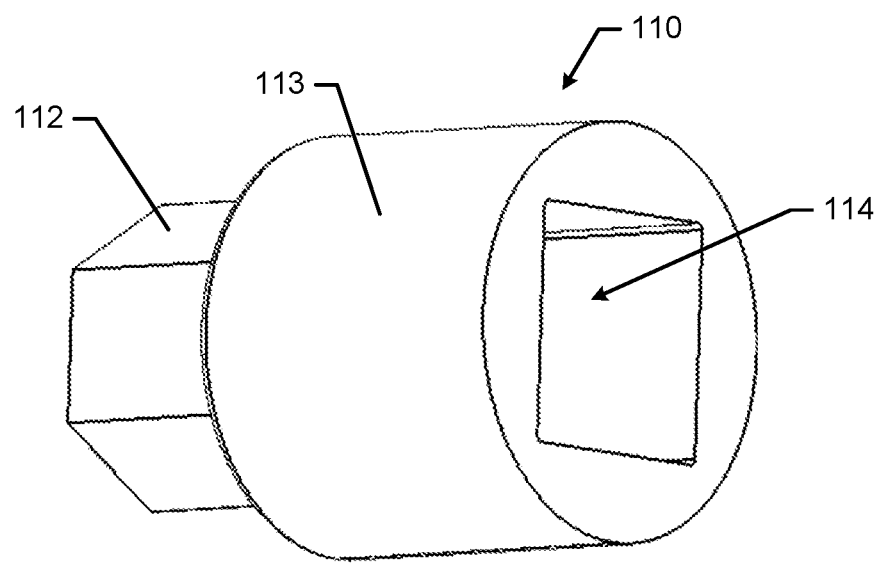
Figure 17:
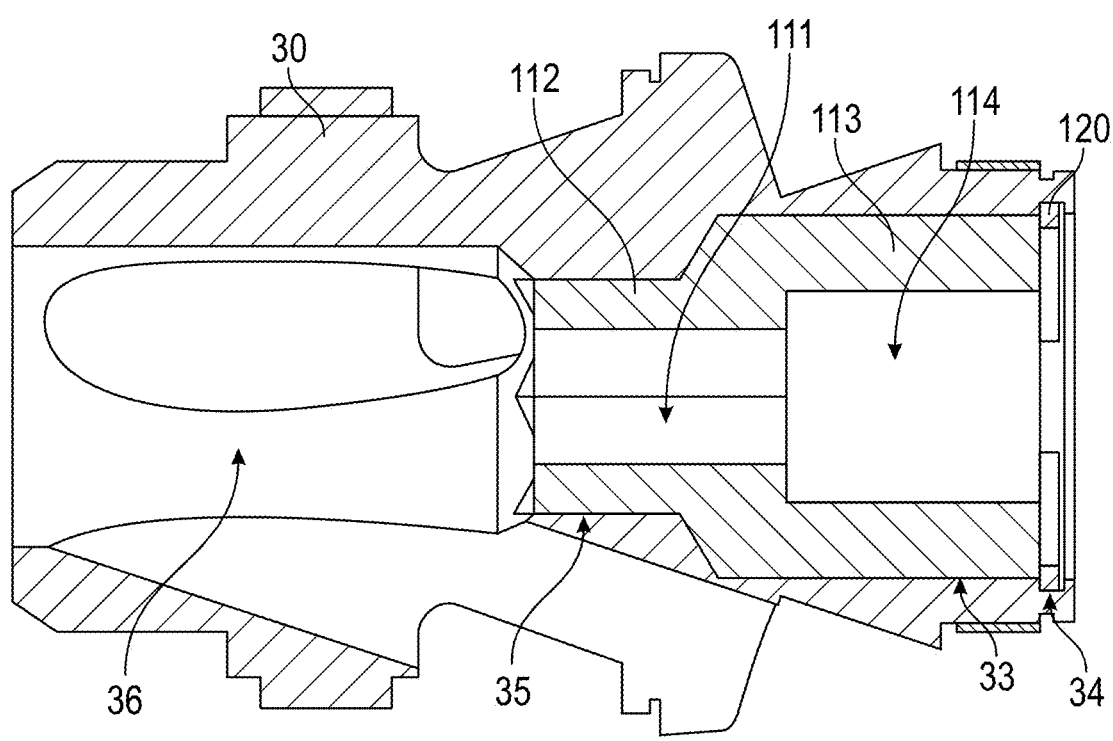

Having thus described some example embodiments in general terms, reference will now be made to the accompanying drawings, which are not necessarily drawn to scale, and wherein:

FIG. 1 illustrates a perspective side view of a chuck in accordance with an example embodiment;

FIG. 2 illustrates a front view of the chuck defining a cross-section A-A in accordance with an example embodiment;

FIG. 3 illustrates cross-section side view of the chuck taken at the plane defined by A-A of FIG. 2 in accordance with an example embodiment;

FIG. 4 illustrates a perspective view of a body of the chuck in accordance with an example embodiment;

FIG. 5 illustrates a perspective side view of a clutch of the chuck in accordance with an example embodiment;

FIG. 6 illustrates a perspective side view of the clutch with a pull ring in accordance with an example embodiment;

FIG. 7 illustrates a perspective side view of a nut of the chuck in accordance with an example embodiment;

FIG. 8 illustrates a side view of select components of the chuck with the clutch in a jaw actuating position in accordance with an example embodiment;

FIG. 9 illustrates a side view of select components of the chuck with the clutch in a working position in accordance with an example embodiment;

FIG. 10A illustrates cross-section side view of a chuck showing a forward engagement between a body and a nut in accordance with an example embodiment;

FIG. 10B illustrates a magnified portion of FIG. 10A, again showing a forward engagement between a body and a nut in accordance with an example embodiment;

FIG. 11A illustrates a perspective side view of the body with a location spring in accordance with an example embodiment;

FIG. 11B illustrates a perspective side view of the location spring in accordance with an example embodiment;

FIG. 12 illustrates a cross-section side view of the clutch showing a jaw actuating position recess and a working position recess in accordance with an example embodiment;

FIG. 13A illustrates cross-section side view of a chuck taken at the plane defined by A-A of FIG. 2 with the clutch in the jaw actuating position in accordance with an example embodiment;

FIG. 13B illustrates a magnified portion of FIG. 13A with the clutch in the jaw actuating position in accordance with an example embodiment;

FIG. 14A illustrates cross-section side view of a chuck taken at the plane defined by A-A of FIG. 2 with the clutch in the working position in accordance with an example embodiment;

FIG. 14B illustrates a magnified portion of FIG. 14A with the clutch in the working position in accordance with an example embodiment;

FIG. 15 illustrates a perspective front view of a connect socket in accordance with an example embodiment;

FIG. 16 illustrates a perspective rear view of the connect socket in accordance with an example embodiment; and FIG. 17 illustrates a cross-section side view of select components of the chuck taken at the plane defined by A-A of FIG. 2 including the body with the connect socket installed in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As mentioned above, chuck over-tightening and unexpected loosing can be caused by inertia stored in, for example, a sleeve of a chuck, generated by rotation of a power driver when performing working operations (e.g., drilling a hole, tightening a fastener, or the like). Unexpected and undesired movement of a nut that is operably coupled to the sleeve can cause the jaws of a chuck to move, particularly when the chuck is used with a power driver that is an impact driver. In some instances, the rotational force provided by an impact driver can be quite large, relative to other types of power drivers, and are commonly used to, for example, fasten a screw or bolt, drill a hole in wood, or the like.

However, the oscillating action from rotational impact, particularly when coupled with the inertia caused by rotation, can cause the nut to vibrate, loosen, and begin to move. Such vibration can also cause the nut to move from a properly tightened position where the jaws are held in a fixed position to a loosened position that permits the jaws to open and allows the working bit to slip within the jaws or even be released an fall from the chuck.

Some conventional solutions for overcoming the effects of vibration caused by an impact driver involve the installation of an adapter between the chuck and the drive spindle of the impact driver. At least in some instances, such an adapter is connected to the chuck via a threaded connection. Due to the threaded engagement, the adapter may be susceptible to loosening inertia when the impact driver is operating a reverse rotational direction or over-tightening inertia when the impact driver is operating in a forward rotational direction. Additionally, such an adapter increases the length (i.e., the length of the chuck plus the adapter), which may make the solution bulky and, for example, limit useability of such as solution in certain space constrained environments.

To overcome these challenges, various example embodiments of a chuck are provided that integrate a locking mechanism into the chuck that operates to lock the nut in a fixed position while the chuck is in a working mode (e.g., drilling a hope, driving a fastener, or the like), but also permits the nut to move to allow for opening and closing of the jaws to remove or install a working bit in a jaw actuating mode. To do so, according to some example embodiments, a locking clutch may be included that is slideable on the body of the chuck to engage and lock the nut in position when the clutch is in a working position, and release the nut to permit movement of the nut and jaws when the clutch is in a jaw actuation position. According to some example embodiments, the clutch may include or be coupled with a user interface member that permits a user to move the clutch between the working position and the jaw actuating position.

In this regard, FIGS. 1 and 2 show an example chuck 10 according to some example embodiments. FIG. 1 is a perspective side view of the chuck 10 and FIG. 2 is s front view of the chuck 10. Generally, the chuck 10 may operate to secure a working bit (not shown) in the jaws 20 of the chuck 10 while the chuck 10 and a power driver affixed to the chuck 10 are working. The chuck 10 may also operate to permit the working bits of varying sizes (e.g., diameters) to be installed and removed by moving the jaws 20 in an opening or closing direction. Further, the chuck 10 may be operably coupled with any type of power driver, including, for example, a pneumatic or electric powered tool (e.g., a drill) configured to rotate a drive spindle that is operably coupled to the chuck 10 in an opening on a rear side of the chuck 10.

The chuck 10 may define a center axis 11, about which the chuck 10 may rotate when in operation, due to rotation of the drive spindle of an attached power driver. For orientation purposes, the chuck 10 may have a forward end 13 and a rearward end 14. The chuck 10 may comprise, among other components, jaws 20, a body 30, a nose 40, a sleeve 60 and a rear sleeve 70. As further described herein, the jaws 20 may be configured to move or translate in a closing or opening direction to change the size of a jaw opening between the forward ends of the jaws 20. According to some example embodiments, rotation of the sleeve 60 in the direction 12 may cause the jaws 20, via a nut, to translate in an opening direction to expand the jaw opening to receive a working bit. Further, rotation of the sleeve 60 in a direction opposite to direction 12 may cause the jaws 20, via the nut, to translate in a closing direction to reduce the jaw opening and clamp onto a working bit.

To better understand the components and operation of the chuck 10, FIG. 3 provides a cross-section side view of the chuck 10 taken at the plane defined by A-A in FIG. 2. Among other components that will be further described herein, the chuck 10 may include the jaws 20, the body 30, a nut 80, the sleeve 60, a bearing assembly 90, and a connect socket 110. The body 30 may be a central component of the chuck 10 that is operably coupled to the drive spindle of a power driver directly or via the connect socket 110 as further described below. The body 30 may operate to transfer rotation of the drive spindle to the jaws 20 to drive the working bit. The jaws 20 may be operably coupled to the body 30 via jaw passageways 31 in the body 30 as shown in FIG. 4, and the jaws 20 may be disposed at a forward end of the chuck 10. Because the jaws 20 are rotationally constrained in the jaw passageways 31 of the body 30, the jaws may rotate with the body 30. However, the jaws 20 may be configured to move or translate relative to the body 30 within the jaw passageways 31 in response to movement of the nut 80.

The nut 80 may include nut threading 81 that is configured to engage with jaw threading 21 on each of the jaws 20. Due to the threaded engagement between the jaws 20 and the nut 80, the jaws 20 may move in the opening (untightening) or closing (tightening) direction depending on the direction (clockwise or counterclockwise) that the nut 80 rotates relative to the body 30. The nut 80 may be operably coupled (e.g., interference fit or physically affixed) to the sleeve 60, and a user may rotate the sleeve 60 to, in turn, rotate the nut 80. As such, rotation of the nut 80 may cause the jaw opening to close such that the jaws 20 clamp onto a working bit or open to permit removal or installation of a working bit. The nut 80 may be operably coupled (e.g., physically affixed) to the sleeve 60, which is external to the chuck 10. As such, to rotate the nut 80, a user may rotate the sleeve 60, which in turn rotates the nut 80. To provide for smooth and low friction rotation of the nut 80, the nut 80 may be operably coupled to the bearing assembly 90, which may be comprised of washers and a plurality of bearing balls.

As mentioned above, the chuck 10 may include a mechanism for locking the nut 80 in place when the chuck 10 is in a working mode to prevent unintended and undesired movement, e.g., rotation, of the nut 80. The chuck 10 may therefore include a clutch assembly that interfaces with the nut 80 to transition the chuck 10 between a working mode where the nut 80 is locked in place and a jaw actuating mode where the nut 80 is permitted to rotate to open and close the jaws 20. Accordingly, the chuck 10 may include a clutch 100 that may slide axially relative to the body 30 between a working position where the clutch 100 is engaged with the nut 80 thereby locking the nut 80 in position (i.e., preventing movement such as rotation of the nut 80 relative to the body 30, in other words, the nut 80 is locked to the body 30) and a jaw actuating position where the clutch 100 is not engaged with the nut 80, thereby permitting the nut 80 to freely move, for example, rotate. As further described below, the clutch 100 may be maintained in position by a biased protrusion that may be a component of, for example, a location spring 140. Additionally, clutch 100 may be axially biased in a rearward direction by the press spring 130 to maintain pressure on the clutch 100 and facilitate smooth movement of the clutch 100 during user operation of the clutch 100. Additionally, the clutch 100 may be operably coupled (e.g., physically affixed) to a pull ring 50 that operates as a user interface for the clutch 100.

As further described below, the chuck 10 may also include a connect socket 110 that may be formed, for example, of a heat treated steel. The connect socket 110 may be press fit into the body 30 such that the connect socket 110 rotates with the body 30. The connect socket 110 may include a forward socket cavity 111 that may be configured to receive, through the jaw opening and a forward opening of the body center hole 36, a rearward end or shank of a working bit. According to some example embodiments, the forward socket cavity 111 of the connect socket 110 (see FIG. 15) may be configured to secure the rearward end or shank of the working bit in position for working operation with the working bit. In this regard, for example, after drilling a hole with a working bit that is a drill bit, the drill bit may be removed from the chuck 10, and the user may wish to drive a screw into the drilled hole. To do so, the user may install a screw driver bit by, for example, press fitting or slide fitting the screw driver bit into the forward socket cavity 111 of the connect socket 110 and then drive the screw, where slide fitting requires less force to install the bit relative to press fitting due to increased clearance between the bit and the forward socket cavity 111. As such, according to some example embodiments, the screw driver bit or any other working bit that shaped to interface with the forward socket cavity 111 may be used in working operation when secured into the forward socket cavity 111 without having to clamp the jaws 20 onto the screw driver bit or other working bit. Additionally, the connect socket 110 may have a rear connection interface 114 (see FIG. 16) that may be shaped for engagement with a drive spindle of a power driver. According to some example embodiments, because power driver spindles are not uniform, the connect socket 110 may be configured to be removable and replaceable with alternative connect sockets 110 having different shapes for engaging with differently shaped drive spindles. In this regard, the connect socket 110 may be secured within the rear cavity 33 of the body 30 by, for example, snap ring 120. According to some example embodiments, the connect socket 110 need not include threading for engaging with a drive spindle and thereby may overcome issues with threaded engagement between chucks and drives spindles such as over-tightening of the chuck 10 onto the drive spindle or unintended loosening of the chuck 10 from the drive spindle.

Referring again to the clutch assembly of the chuck 10, FIG. 4 provides a perspective view of the body 30. The body 30 may be formed of steel, hardened steel, aluminum, aluminum alloys, other hardened non-metals, or the like. As mentioned above, the body 30 may be disposed centrally to the chuck 10 and may operate as a foundational component that supports some or all of the other components of the chuck 10. The body 30 may include a one or more slots 32 the extend axially on an external surface of the body 30. These slots 32 may be positioned to align with slugs 101 on the internal surface of the clutch 100 as shown in FIG. 5.

The clutch 100, as shown in perspective view in FIG. 5, may be ring-shaped and may be disposed around an external surface of the body 30. Similar to the body 30, the clutch 100 may, for example, be formed of steel, hardened steel, aluminum, aluminum alloys, other hardened non-metals, a powder metal part, or the like. Additionally, the lugs 101 of the clutch 100 may positioned on an internal surface of the clutch 100 and extend inward toward the central axis 11. In the example embodiment shown in FIG. 5, the clutch 100 include three lugs 101 to engage with the three slots 32 shown on the body 30 in FIG. 4. However, any number of lugs 101 and slots 32 may be used. The lugs 101 may be sized to have a width that is smaller or slightly smaller than the width of the slots 32 of the body 30 to facilitate sliding of the lugs 101 in an axial direction within the slots 32. However, the engagement between the lugs 101 and slots 32 may operate to prevent the clutch 100 from rotating relative to the body 30, but permit the clutch 100 to slide axially relative to the body 30. It is understood that the positioning of the lugs 101 and the slots 32 may be inverted such that lugs 101 are disposed on the body 30 and the slots are disposed on the clutch 100 to support similar axial sliding operation.

As further described below, the clutch 100 may include clutch teeth 102. The clutch teeth 102 may be formed on an rearward facing surface of the clutch 100 such that the tips of the teeth 102 extend in the rearward direction. According to some example embodiments, the teeth 102 may be disposed about the circumference of the rear facing edge of the clutch 100, for example, in an evenly spaced fashion.

With reference to FIG. 6, the clutch 100 may be operably coupled (e.g., physically affixed) or integrated with a user interface element in the form of, form of, for example, a pull ring 50. The pull ring 50 may be disposed external to the clutch 100 relative to the central axis 11 of the chuck 10. The pull ring 50 may operate as a user interface for the clutch 100. In this regard, a user may grip the pull ring 50 and slide the pull ring 50 axially (as constrained by the lugs 101 and the slots 32), using a push or pull motion and thus the clutch 100 may be moved axially between the working position and the jaw actuating position through user interaction with the pull ring 50 as further described below. According to some example embodiments, the pull ring 50 may include a grip 51, in the form for example, grip indentations. Additionally, the pull ring 50 may have a curved, concave external shape to increase graspability of the pull ring 50. The pull ring 50 is one example of a user interface element for controlling movement of the clutch 100 by a user. Other examples of user interface elements may, for example, take a form other than the ring shape of the pull ring 50, such as tabs or the like.

Now referring to FIG. 7, a perspective view of the nut 80 according to some example embodiments is provided. As shown in FIG. 7, the nut 80 may include nut threading 81 and nut teeth 82. The nut 80 may be formed in a ring shape and may be disposed external to the body 30 as shown in FIG. 3. The nut 80 may be formed of, for example, steel, hardened steel, aluminum, aluminum alloys, other hardened non-metals, a powder metal part or the like. The nut threading 81 may be disposed on an internal surface of the nut 80 to facilitate engagement with jaw threading 21. The nut teeth 82 may be formed on a forward facing surface of the nut 80 such that the tips of the teeth 82 extend in the forward direction. According to some example embodiments, the teeth 82 may be disposed about the circumference of the forward facing edge of the nut 80, for example, in an evenly spaced fashion. The configuration of the nut teeth 82 may be such that the nut teeth 82 may engage with the clutch teeth 102.

As mentioned above, the clutch 100 may be axially slideable between a jaw actuating position and a working position. FIGS. 8 and 9 show the positioning of the clutch 100 relative to the nut 80 and the body 30, with other external components removed for visibility. In this regard, an example view of the clutch 100 in the jaw actuating position is provided in FIG. 8. As indicated by arrow 200, the clutch 100 has been shifted or slid axially forward such that a gap is formed between the clutch teeth 102 and the nut teeth 82. Since the nut 80 is not engaged with clutch 100, nut 80 is free to rotate relative to the body 30 to cause the jaws 20 to move in the opening or closing directions. FIG. 9, on the other hand, shows the clutch 100 in the working position. As indicated by arrow 201, the clutch 100 has been shifted or slid axially rearward such that the clutch teeth 102 move into engagement with nut teeth 82 such that no gap is formed between the clutch teeth 102 and the nut teeth 82. The clutch teeth 102 and the nut teeth 82 may have round or beveled tips to facilitate smooth engagement as the teeth meet and become engaged. Since, via the teeth, the nut 80 is engaged with clutch 100, the nut 80 is prevented from moving axially rearward by the bearing assembly 90 and axially forward by the body 30 as shown in FIGS. 10A and 10B further described below. Additionally, the nut 80 is prevented from rotating relative to the body 30 due to the engagement with the clutch 100, which is prevented from rotating relative to the body 30 due to the engagement between the lugs 101 of the clutch 100 with the slots 32 of the body 30. As such, when the clutch 100 is in the working position, the nut 80 is locked in position with the body 30 and prevented from moving which, in turn, prevents the jaws 20 from moving and maintains clamping pressure by the jaws 20 on the working bit.

FIG. 10A is a cross-section side view of the chuck 10 that shows the interaction between the nut 80 and the body 30 to prevent forward axial movement of the nut 80, regardless of the axial position of the clutch 100. In this regard, as best seen in FIG. 10B, which is a magnified view of area 205 in FIG. 10A, according to some example embodiments, nut 80 may include a lip 83 that is aligned with extended portion 37 of the body 30, such that the due to physical engagement between the lip 83 and the extended portion 37, the nut 80 is prevented from forward axial movement.

The clutch assembly may also include features to maintain the clutch 100 in position when the clutch 100 is moved into the working position or the jaw actuating position. In this regard, according to some example embodiments, the chuck 10 may include a biased protrusion 141 that engages with recesses in the clutch 100 to hold the clutch 100 in a desired position. The biased protrusion 141 may be embodied in a variety of ways, such as with a detent mechanism or the like. Referring to FIGS. 11A and 11B, according to some example embodiments, the biased protrusion 141 may be formed by a location spring 140. The location spring 140 may have, for example, a circular or oval cross-section. The location spring 140 may be formed as a ring with an open section that permits the location spring 140 to be compressed, thereby providing a radially directed bias away from the center axis 11. The location spring 140 may be disposed on an external surface of the body 30 such that the location spring 140 axially fixed (i.e., cannot move in an axial direction). According to some example embodiments, location spring 140 may be held in a fixed axial position within a groove formed between a portion of the body 30 and the nose 40, which may be interference fit or physically affixed to the body 30. Due to the cross-sectional shape of the location spring 140 (e.g., circular, oval, or the like), a portion of the location spring 140 may extend radially outward to form the biased protrusion 141.

Referring now to FIG. 12, a cross-sectional view of the clutch 100 is provided. As shown in FIG. 12, the clutch 100 may include two recesses configured to engage with the protrusion 141 which may apply a press force on an aligned recess to maintain the clutch 100 in either the jaw actuating position or the working position. In this regard, the clutch 100 may include, on the internal surface of the clutch 100, a jaw actuating position recess 103 and a working position recess 104 configured to receive the biased protrusion 141. In this regard, the clutch 100 may be axially slidable (as described above) to move into positions to engage the jaw actuating position recess 103 with the biased protrusion 141 or the working position recess 104 with the biased protrusion 141. The jaw actuating position recess 103 may be positioned such that the clutch teeth 102 are not engaged with the nut teeth 82 when the biased protrusion 141 of the lock spring 140 is engaged with the jaw actuating position recess 103. Similarly, the working position recess 104 may be positioned such that the clutch teeth 102 are engaged with the nut teeth 82 when the biased protrusion 141 of the lock spring 140 is engaged with the working position recess 104. Due to the biasing of the protrusion 141 as a portion of, for example, the location spring 140, the protrusion 141 may be compressed and thereby permit sliding of clutch 100 when the clutch 100 is in a position between the jaw actuating position and the working position.

In this regard, FIGS. 13A and 13B show the chuck 10 and details of the component positions, when the clutch 100 is in the jaw actuating position. FIG. 13A is a cross-section of the chuck 10 taken at the plane defined by A-A of FIG. 2 with select components shown. FIG. 13B is a magnified view of an area 203 to show clutch recess engagement. With respect to FIG. 13A, it can be seen that the user has slid, for example via interaction with the pull ring 50, the clutch 100 in an axial forward direction 200 to place the clutch 100 in the jaw actuating position with the clutch teeth 102 disengaged from the nut teeth 82. As shown in FIG. 13B, the biased protrusion 141 of the location spring 140 is disposed within the jaw actuating position recess 103 of the clutch 100. Due to the engagement between the biased protrusion 141 and the jaw actuating position recess 103, the clutch 100 may be held in the jaw actuating position requiring an axially directed force to move the clutch 100 out of the jaw actuating position.

Similarly, FIGS. 14A and 14B show the chuck 10 and details of the component positions, when the clutch 100 is in the working position. FIG. 14A is a cross-section of the chuck 10 taken at the plane defined by A-A of FIG. 2 with select components shown. FIG. 14B is a magnified view of area 204 to show clutch recess engagement. With respect to FIG. 14A, it can be seen that the user has slid, for example via interaction with the pull ring 50, the clutch 100 in an axial rearward direction 201 to place the clutch 100 in the working position with the clutch teeth 102 engaged with the nut teeth 82. As shown in FIG. 14B, the biased protrusion 141 of the location spring 140 is disposed within the working position recess 104 of the clutch 100. Due to the engagement between the biased protrusion 141 and the working position recess 104, the clutch 100 may be held in the working position requiring an axially directed force to move the clutch 100 out of the working position. As such, the engagement between the biased protrusion 141 and the working position recess 104 operates to maintain the nut 80 in a fixed or stationary position to prevent movement of the jaws 20.

FIGS. 15-17 are directed to the connect socket 110 and the operation of the connect socket 110. In this regard, FIG. 15 shows a perspective front view of the connect socket 110. As can be seen in FIG. 15, the connect socket 110 may include an external forward connection interface 112. The external forward connection interface 112 may have a forward socket cavity 111. The external surface of the external forward connection interface 112 may be shaped to engage with a corresponding internal surface of the body 30. In this regard, as shown in FIG. 13, the body 30 may include a rear cavity 33 that is open on a rearward side of the body 30. The rear cavity 33 may include a connect socket receiving cavity 35 that defines a forward inner surface of the rear cavity 33 that is shaped to receive the external forward connection interface 112 of the connect socket 110. The connect socket receiving cavity 35 and the external forward connection interface 112 may fit together in a manner that prevents rotational slipping between the surfaces such that the body 30 rotates with the connect socket 110. In this regard, for example, the external forward connection interface 112 may have a hexagonal-shaped external surface that is sized to tightly fit into a hexagonal-shaped internal surface of the connect socket receiving cavity 35 in the body 30. As such, the connect socket 110 may be installed into the rear cavity 33 such that the external forward connection interface 112 is inserted into the connect socket receiving cavity 35 as shown in FIG. 17, which is a cross-section view of the body 30 and the connect socket 110 taken at the plane defined by A-A as shown in FIG. 2. The connect socket 110 may be secured into the rear cavity 33 by the snap ring 120 that is disposed within a slot 34 on the internal surface of the rear cavity 33.

As mentioned above, the forward socket cavity 111 of the connect socket 110 may be configured to receive the shank, i.e., the rearward end, of a working bit, when the working bit is installed in the chuck 10 through the body center hole 36 in the body 30. In this regard, the forward socket cavity 111 may take any shape, such as a hexagonal shape (e.g., a one-fourth inch hexagonal shape), that is configured to receive working bits having a particular shank (e.g., a one-fourth inch hexagonal shank). The forward socket cavity 111 may be centered about the center axis 11, when the connect socket 110 is installed within the body 30. As such, the forward socket cavity 111 may operate to secure a working bit, for example, simply by press fitting or slide fitting the shank of the working bit into the forward socket cavity 111, even without closing the jaws 20 onto the working bit. By holding the shank of the working bit in this manner, working bits that can interface with the forward socket cavity 111 may be installed, used and removed quickly, without having to clamp the jaws 20 onto the working bits. Accordingly, for example, the use of the connect socket 110 may also operate to limit or eliminate the occurrences of deformation to the body 30 due to the material strength of connect socket 110 being higher than body 30.

The connect socket 110 may also include a rear portion 113. According to some example embodiments, the rear portion 113 may have an external surface that is shaped differently than the external forward connection interface 112. For example, the rear portion 113 may have a cylindrical external shape. The rear portion 113 may also include a rear socket cavity that embodies a rear connection interface 114. The rear connection interface 114 may be shaped for receiving a drive spindle of a power driver. As mentioned above, different power drivers can have differently shaped spindles. As such, the rear connection interface 114 may be shaped to receive a desired spindle. For example, the rear connection interface 114 may be shaped to receive a drive spindle that is three-eighths inch square. According to some example embodiments, the rear connection interface 114 may be shaped (e.g., as a square, hexagon, or the like) such that no threading is required for engagement with desired drive spindles, thereby avoiding issues with over-tightening or unexpected and undesired loosening of the chuck on the spindle which can be associated with threaded engagements.

An advantage of the connect socket 110, according to some example embodiments, is that different connect sockets may be used with the same chuck 10. As such, at assembly of the chuck 10, a particular connect socket 110 may be selected for a particular application (i.e., particular drive spindle), and installed in the body 30 with the snap ring 120. As such, the use of the connect socket 110 in this manner allows for manufacturing flexibility without having to design specific chucks, in their entirety, for specific drive spindles. Further, with the use of the snap ring 120, changes to the connect socket 110 may be performed by a user, for example at a work site, to allow the chuck 10 to be used with different power drivers having different drive spindles by simply replacing the connect socket 110.

Further, as shown in FIG. 10A, according to some example embodiments, the chuck 10 may also be used with an adapter 210. The adapter 210 may be installed into the chuck 10 to permit use of the chuck 10 with certain power drivers that, for example, require use an adapter 210 to couple the chuck 10 to the spindle of the power driver. In this regard, the spindle of the power driver may include a receiving cavity for receiving and securing the post 211 of the adapter 210. Further, a forward position 212 of the adapter 210 may be installed into the rear cavity 33 of the body 30. In this regard, the connect socket 110 may be removed and the adapter 210 may be installed directly into the rear cavity 33 of the body 30. According to some example embodiments, the rear cavity 33 and the forward portion 212 of the adapter 210 may include parallel axially extending grooves that engage between the body 30 and the adapter 210 when the adapter is installed to facilitate forming rotational coupling between the body 30 and the adapter 210.

In view of the foregoing, an example chuck is provided that may be configured for use with a power driver having a rotatable drive spindle (e.g., an impact driver). The example chuck may comprise a plurality of jaws with each jaw including jaw threading. The example chuck may further comprise a body configured to rotate with the drive spindle. The plurality of jaws may be configured to rotate with the body about a center axis of the example chuck. The plurality of jaws may also be configured to move relative to the body in an opening or closing direction. The example chuck may further comprise a nut operably coupled with the jaw threading of the jaws such that rotation of the nut relative to the body moves the jaws relative to the body in the opening or closing direction. The nut may further comprise nut teeth. The example chuck may further comprise a clutch including clutch teeth. The clutch may be operably coupled to the body such that the clutch rotates with the body. The clutch may be configured to move between a working position and a jaw actuating position. In the working position, the clutch teeth may be engaged with the nut teeth to prevent rotation of the nut relative to the body, and, in the jaw actuating position, the clutch teeth need not be engaged with the nut teeth and the nut may be rotatable about the body.

According to some example embodiments, the clutch may be configured to move between the working position and the jaw actuating position by sliding axially relative to the body. Additionally or alternatively, the nut teeth may be disposed on a forward facing surface of the nut and the clutch teeth may be disposed on a rearward facing surface of the clutch. Additionally or alternatively, the example chuck may further comprise a protrusion, a jaw actuating position recess, and a working position recess. In this regard, the clutch may be configured to slide into the working position where the protrusion engages with the working recess to hold the clutch in the working position. Further, the clutch may be configured to slide into the jaw actuating position where the protrusion engages with the jaw actuating position recess to hold the clutch in the jaw actuating position. Additionally or alternatively, the protrusion may extend radially away from the center axis of the chuck and may be biased toward the jaw actuating position recess or the working position recess. Additionally or alternatively, the example chuck may further comprise a location spring. In this regard, the location spring may comprise the protrusion. Additionally or alternatively, the example chuck may further comprise a press spring that biases the clutch towards the working position. Additionally or alternatively, the example chuck may further comprise a pull ring affixed to the clutch such that the pull ring slides axially with the clutch relative to the central axis. In this regard, the pull ring may be configured to provide a user interface to permit manual movement of the pull ring and the clutch between the working position and the jaw actuation position by a user. Additionally or alternatively, the example chuck may further comprise a connect socket. The connect socket may comprises an external forward connection interface that engages an inner surface of a rear cavity of the body such that the connect socket rotates with the body. The connect socket may comprise a rear connection interface configured to engage with the drive spindle such that the connect socket rotates with the drive spindle. Additionally or alternatively, the connect socket may further comprise a forward socket cavity comprising an inner connection interface. The inner connection interface may be configured to receive a rear portion of the working bit and hold the working bit in a central location during jaw actuation.

In view of the foregoing, according to some example embodiments, another example chuck is provided that comprises a plurality of jaws and a body configured to rotate with a drive spindle of a power driver. The plurality of jaws may be configured to rotate with the body about a center axis of the chuck, and the plurality of jaws may also be configured to move relative to the body in an opening or closing direction. The example chuck may also comprise a nut comprising nut teeth. The nut may be operably coupled to the jaws and configured to move the jaws relative to the body in the opening or closing direction. The example chuck may also comprise a clutch including clutch teeth. The clutch may be configured to move between a working position and a jaw actuating position. In the working position, the clutch teeth may be engaged with the nut teeth to prevent movement of the nut relative to the body, and, in the jaw actuating position, the clutch teeth need not be engaged with the nut teeth and the nut may be free to move relative to the body.

Additionally or alternatively, the clutch may be configured to move between the working position and the jaw actuating position by sliding axially relative to the body. Additionally or alternatively, the nut teeth may be disposed on a forward facing surface of the nut and the clutch teeth may be disposed on a rearward facing surface of the clutch. Additionally or alternatively, the example chuck may further comprise a protrusion, a jaw actuating position recess, and a working position recess. The clutch may be configured to slide into the working position where the protrusion engages with the working recess to hold the clutch in the working position. The clutch may also be configured to slide into the jaw actuating position where the protrusion engages with the jaw actuating position recess to hold the clutch in the jaw actuating position. Additionally or alternatively, the protrusion may be moveable radially relative to the center axis of the chuck and may be biased toward the jaw actuating position recess or the working position recess. Additionally or alternatively, the example chuck may further comprise a location spring that comprises the protrusion. Additionally or alternatively, the example chuck may comprise a connect socket. The connect socket may comprise an external forward connection interface that engages an inner surface of a rear cavity of the body such that the connect socket rotates with the body. The connect socket may also comprise a rear connection interface configured to engage with the drive spindle such that the connect socket rotates with the drive spindle. Additionally or alternatively, the connect socket may further comprises a forward socket cavity comprising an inner connection interface configured to receive a rear portion of the working bit and hold the working bit in a central location during jaw actuation.

In view of the foregoing, another example chuck is provided. In this regard, the example chuck may comprise a plurality of jaws and a body configured to rotate with a drive spindle of a power driver. The plurality of jaws may be configured to rotate with the body about a center axis of the chuck, and the plurality of jaws may also be configured to move relative to the body in an opening or closing direction. The example chuck may also comprise a nut comprising nut teeth. The nut may be operably coupled to the jaws and configured to move the jaws relative to the body in the opening or closing direction. The example chuck may also comprise a clutch including clutch teeth. The clutch may be movable by a user between a working position and a jaw actuating position. The clutch may comprise a working position recess and a jaw actuation recess. The example chuck may also comprise a protrusion extending and biased in a radial direction away from the center axis of the chuck. The clutch may be configured to, in response to a user sliding the clutch into the working position, engage the clutch teeth with the nut teeth to prevent movement of the nut relative to the body and move the working position recess into engagement with the protrusion to maintain the clutch in the working position. The clutch may be further configured to, in response to the user sliding the clutch into the jaw actuating position, disengage the clutch teeth from the nut teeth to permit the nut to move relative to the body to move the plurality of the jaws in the opening or closing direction and move the jaw actuating position recess into engagement with the protrusion to maintain the clutch in the jaw actuating position. Additionally or alternatively, the clutch may be configured to move between the working position and the jaw actuating position by sliding axially relative to the body.

Many modifications and other embodiments of the chuck set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a power driver having a rotatable drive spindle, the chuck comprising:
    a plurality of jaws, each jaw including jaw threading;
    a body configured to rotate with the drive spindle, wherein the plurality of jaws are configured to rotate with the body about a center axis of the chuck, wherein the plurality of jaws are also configured to move relative to the body in an opening or closing direction;
    a nut operably coupled with the jaw threading of the jaws such that rotation of the nut relative to the body moves the jaws relative to the body in the opening or closing direction, the nut further comprising nut teeth;
    a clutch including clutch teeth, the clutch being operably coupled to the body such that the clutch rotates with the body, wherein the clutch is configured to move between a working position and a jaw actuating position;
    a location spring comprising a protrusion;
    a jaw actuating position recess; and
    a working position recess;
    wherein, in the working position, the clutch teeth are engaged with the nut teeth to prevent rotation of the nut relative to the body;
    wherein, in the jaw actuating position, the clutch teeth are not engaged with the nut teeth and the nut is rotatable about the body;
    wherein the clutch is configured to slide into the working position where the protrusion engages with the working recess to hold the clutch in the working position; and
    wherein the clutch is configured to slide into the jaw actuating position where the protrusion engages with the jaw actuating position recess to hold the clutch in the jaw actuating position;
    wherein the protrusion extends radially away from the center axis of the chuck and is biased toward the jaw actuating position recess or the working position recess.

2. The chuck of claim 1, wherein the clutch is configured to move between the working position and the jaw actuating position by sliding axially relative to the body.

3. The chuck of claim 1, wherein the nut teeth are disposed on a forward facing surface of the nut and the clutch teeth are disposed on a rearward facing surface of the clutch.

4. The chuck of claim 1 further comprising a press spring that biases the clutch towards the working position.

5. The chuck of claim 1 further comprising a pull ring affixed to the clutch such that the pull ring slides axially with the clutch relative to the central axis, wherein the pull ring is configured to provide a user interface to permit manual movement of the pull ring and the clutch between the working position and the jaw actuation position by a user.

6. The chuck of claim 1 further comprising a connect socket;

wherein the connect socket comprises an external forward connection interface that engages an inner surface of a rear cavity of the body such that the connect socket rotates with the body;

wherein the connect socket comprises a rear connection interface configured to engage with the drive spindle such that the connect socket rotates with the drive spindle.

7. The chuck of claim 6, wherein the connect socket further comprises a forward socket cavity comprising an inner connection interface, the inner connection interface being configured to receive a rear portion of the working bit and hold the working bit in a central location during jaw actuation.

8. A chuck comprising:
a plurality of jaws;
a body configured to rotate with a drive spindle of a power driver, wherein the plurality of jaws are configured to rotate with the body about a center axis of the chuck, wherein the plurality of jaws are also configured to move relative to the body in an opening or closing direction;
a nut comprising nut teeth, the nut being operably coupled to the jaws and configured to move the jaws relative to the body in the opening or closing direction;
a clutch including clutch teeth, the clutch being configured to move between a working position and a jaw actuating position;
a location spring comprising a protrusion;
a jaw actuating position recess; and
a working position recess;
wherein the clutch is configured to slide into the working position where the clutch teeth are engaged with the nut teeth to prevent movement of the nut relative to the body and the protrusion engages with the working position recess to hold the clutch in the working position;
wherein the clutch is configured to slide into the jaw actuating position where the clutch teeth are not engaged with the nut teeth, the nut is free to move relative to the body, and the protrusion engages with the jaw actuating position recess to hold the clutch in the jaw actuating position;
wherein the protrusion extends radially away from the center axis of the chuck and is biased toward the jaw actuating position recess or the working position recess.

9. The chuck of claim 8, wherein the clutch is configured to move between the working position and the jaw actuating position by sliding axially relative to the body.

10. The chuck of claim 8 wherein the protrusion is moveable radially relative to the center axis of the chuck.

11. The chuck of claim 8 further comprising a connect socket;

wherein the connect socket comprises an external forward connection interface that engages an inner surface of a rear cavity of the body such that the connect socket rotates with the body;

wherein the connect socket comprises a rear connection interface configured to engage with the drive spindle such that the connect socket rotates with the drive spindle.

12. The chuck of claim 11, wherein the connect socket further comprises a forward socket cavity comprising an inner connection interface, the inner connection interface being configured to receive a rear portion of the working bit and hold the working bit in a central location during jaw actuation.

13. The chuck of claim 8, wherein the nut teeth are disposed on a forward facing surface of the nut and the clutch teeth are disposed on a rearward facing surface of the clutch.

14. A chuck comprising:
a plurality of jaws;
a body configured to rotate with a drive spindle of a power driver, wherein the plurality of jaws are configured to rotate with the body about a center axis of the chuck, wherein the plurality of jaws are also configured to move relative to the body in an opening or closing direction;
a nut comprising nut teeth, the nut being operably coupled to the jaws and configured to move the jaws relative to the body in the opening or closing direction; and
a clutch including clutch teeth, the clutch being movable by a user between a working position and a jaw actuating position, the clutch comprising a working position recess and a jaw actuation recess;
a protrusion extending and biased in a radial direction away from the center axis of the chuck;
wherein the clutch is configured to, in response to a user sliding the clutch into the working position, engage the clutch teeth with the nut teeth to prevent movement of the nut relative to the body and move the working position recess into engagement with the protrusion to maintain the clutch in the working position, and
wherein the clutch is further configured to, in response to the user sliding the clutch into the jaw actuating position, disengage the clutch teeth from the nut teeth to permit the nut to move relative to the body and move the plurality of the jaws in the opening or closing direction to move the jaw actuating position recess into engagement with the protrusion to maintain the clutch in the jaw actuating position.

15. The chuck of claim 14, wherein the clutch is configured to move between the working position and the jaw actuating position by sliding axially relative to the body.

\* \* \* \* \*

UNITED STATES PATENT AND TRADEMARK OFFICE
CERTIFICATE OF CORRECTION

PATENT NO. : 11,660,682 B2  
APPLICATION NO. : 17/616476  
DATED : May 30, 2023  
INVENTOR(S) : Jichun Zhou Page 1 of 1

It is certified that error appears in the above-identified patent and that said Letters Patent is hereby corrected as shown below:

On the Title Page

Item (71), "Jacobs Chuck Manufactuirng (Suzhou) Company, Ltd., Jiangsu (CN)" should read --Jacobs Chuck Manufacturing (Suzhou) Company, Ltd., Suzhou (CN)--

Item (73), "Jacobs Chuck Manufactuirng (Suzhou) Company, Ltd., Jiangsu (CN)" should read --Jacobs Chuck Manufacturing (Suzhou) Company, Ltd., Suzhou (CN)--

Signed and Sealed this  
Twenty-fourth Day of October, 2023

Katherine Kelly Vidal  
*Director of the United States Patent and Trademark Office*